United States Patent Office 3,096,314
Patented July 2, 1963

3,096,314
POLYMER CROSSLINKING TECHNIQUE
AND COMPOSITIONS
David Alwyn Stivers and Don L. Peterson, St. Paul,
Minn., assignors to Minnesota Mining and Manufacturing Company, St. Paul, Minn., a corporation of Delaware
No Drawing. Filed June 17, 1960, Ser. No. 36,744
6 Claims. (Cl. 260—87.7)

This invention relates to a method for crosslinking fluorinated polymers and crosslinking compositions for use therein. In one aspect this invention relates to a new vulcanization admixture with reduced tendency to scorch. In another aspect this invention relates to the modification of the characteristics of chain saturated polymers containing halogen substituents on the carbon atoms, particularly those polymers having elastomeric properties.

In general, chain polymers are thermoplastic in nature and exhibit continuous flow under the influence of heat and pressure. Such polymers can be resoftened as often as desired and are usually soluble in selected solvents. However, crosslinked or vulcanized polymers are generally thermosetting, i.e. insoluble in most solvents and incapable of being resoftened without decomposition, since they are permanently hardened. A chain or linear polymer may nevertheless contain a small number of crosslinkages without losing its thermoplastic properties. It is often desirable to convert thermoplastic polymers into crosslinked polymers or into partially crosslinked polymers in order to decrease their solubility and thermoplastic flow properties and to obtain a harder and tougher product. The crosslinking of elastomers is commonly referred to as vulcanization.

Among the most difficult vulcanizable thermoplastic resins are those prepared by the polymerization of halogenated monoolefins, such as, for example, the copolymers of chlorotrifluoroethylene and vinylidene fluoride and the copolymers of perfluoropropene and vinylidene fluoride. Many of these fluorinated thermoplastic polymers have unique and valuable properties. In some cases, when it is desired to retain these properties and at the same time decrease the thermoplastic flow and solubility, the polymers are crosslinked. Such crosslinking has heretofore been difficult to accomplish satisfactorily with certain highly desirable curing agents due to an excessively rapid curing rate and the resultant "scorching" (i.e. precuring) in the mill, extruder, etc. and "backrinding" (i.e. pitting and nonuniformity at the flash line when molding or curing).

The polyfunctional organic compounds containing at least two primary or secondary amino groups per molecule represent highly desirable crosslinking agents for polymers which are at least half fluorinated. However, by virtue of their high order of reactivity as crosslinking or vulcanization agents, practical vulcanization procedures and control of curing rate are extremely difficult. For example, one disadvantage in the vulcanization of these highly fluorinated polymers is observed when blending the vulcanization agent into the polymeric material by use of mechanical shearing forces. The blending takes place over an extended period of time, and the shearing forces generate heat. The high temperature thus generated causes the initiation of the crosslinking reaction either prior to the complete blending of the vulcanization agent into the polymeric material or in subsequent processing steps, such as extrusion, calendering, etc. The crosslinking reaction is thereby self-initiated, since it is exothermic and causes an increase in temperature. This results in scorching during the milling process owing to the nonuniformly blended vulcanizing agent.

It is possible to effect some control of the crosslinking reaction by using acyclic polyfunctional amine salts which contain a terminal carbamic radical and correspond to the formula $N_2C_nH_2X_{2n}O_2$ wherein X is selected from the group consisting of hydrogen, chlorine and fluorine atoms and alkyl, amyl and amino radicals, $n$ is an integer from 3 to 20, and at least one hydrogen atom is bonded to each of the nitrogen atoms. Such crosslinking agents are described in U.S. patent application Serial No. 839,292, filed September 11, 1959. However, even though these crosslinking agents permit a more controlled, slower cure rate than the polyamines, still further control and a somewhat slower cure rate is often desired to eliminate the disadvantages mentioned above.

It is therefore an object of this invention to provide a new and improved crosslinking composition.

Another object of this invention is to provide a new curable, fluorinated polymer composition.

Still another object of this invention is to provide a method for crosslinking vulcanizable fluorinated elastomers.

A further object of this invention is to provide a method for regulating the cure rate of vulcanizable fluorinated elastomers and for preventing scorching and backrinding.

Other objects and advantages of the present invention will become apparent to those skilled in the art from the accompanying description and disclosure.

According to this invention, a curable, highly fluorinated polymeric material is uniformly admixed with hydroquinone and a carbamic radical containing salt of an acyclic polyfunctional amine. This admixture, with or without additional compounding agents and additives, is then crosslinked or cured at an elevated temperature.

Although the mechanism is not fully understood, the presence of minor quantities of hydroquinone in this system serves to retard the curing rate otherwise obtained with the carbamic radical containing salts alone, and to reduce the tendency to scorch and backrind. Phenolic compounds such as phenol and xylenol fail to slow the cure rate with these curing agents or have had only an insufficient retardation effect.

The vulcanizable polymers which are cured according to this invention are linear, chain saturated, fluorinated polymers which contain reactive substituents selected from the group consisting of fluorine, chlorine, bromine and iodine atoms, ether and ester radicals, and which are at least half halogenated. The preferred vulcanizable polymers are at least half fluorinated; however, when the polymer is perhalogenated it is preferable that the entire polymer chain does not contain —$CF_2$— units. Homopolymers of tetrafluorethylene and other perfluorinated olefins, and copolymers with other perfluorinated co-monomers require very high temperature to effect crosslinking and are not within the scope of this invention. It becomes difficult at such temperatures to control the distribution of the crosslinking agent in the polymer, and a nonuniformly crosslinked polymer may be produced.

Linear fluorinated elastomers generally contain disordered, saturated, fluorinated carbon chains which include a substantial number of —$CH_2$— units, usually at least 10 percent of the chain carbon atoms. Disorder in the carbon chains is ordinarily achieved by the copolymerization of at least two monoolefinic compounds of the type hereinafter described. When one of the monoolefinic compounds contains an unsaturated chain of three or more carbon atoms, alkyl side groups, e.g. methyl, ethyl, etc., are present in the final polymer, and these alkyl groups are preferably perhalogenated, most preferably perfluorinated. Points of unbalance in the carbon chain, which are necessary for elastomeric properties, are provided by these side groups. Such side groups cause a bending of the linear carbon chain and then provide additional degrees of freedom in space, produce an unsymmetrical or unbalanced chain carbon atom to which they are attached (provided a second similar group is not also attached to the same chain carbon atom). However, unbalance is also provided by the presence of other unbalanced units in the linear carbon chain, such as —CFCl—. Irrespective of the units providing such points of imbalance, whether by two physically different substituent atoms or by a side group on a chain carbon atom, at least 10 percent of the chain carbon atoms should be unbalanced.

The linear, saturated, fluorinated carbon chain in the elastomers may also contain chlorine substituents, provided a single chain carbon atom has no more than one chlorine attached thereto to produce instability or to influence the chemical nature of the elastomer. The presence of more than one perfluoroalkyl side chain or chlorine substituent on a single chain carbon atom produces symmetry and a point of rigidity in the chain, decreasing the flexibility of the chain and the elastomeric properties accordingly.

Among the chain saturated polymers which may be cross-linked in accordance with this invention are the polymers of chlorotrifluoroethylene, vinylidene fluoride, 2-chloroperfluoropropene, chlorotrifluoroethylene, dichlorodifluoroethylene, trifluoroethylene, chlorofluoroethylene, vinylidene fluoride and vinylidene chloride. These monoolefins may be copolymerized with each other in groups of two or more and in any proportions. They may also be copolymerized with other olefinic compounds such as ethylene, tetrafluoroethylene and perfluoropropene.

Particularly preferred are the fluorinated elastomers produced by copolymerizing chlorotrifluoroethylene and vinylidene fluoride, as described in U.S. Patent 2,752,331, and those produced by copolymerizing perfluoropropene and vinylidene fluoride, as described in British complete specification 823,974, published November 18, 1959. The elastomeric copolymers of perfluoropropene and vinylidene fluoride having between about 15 and about 50 mole percent perfluoropropene are outstanding in this respect. It is also within the scope of this invention to cure the lower molecular weight, liquid polymers and copolymers of the above monomers.

The crosslinking agents used in accordance with this invention include acyclic or cycloaliphatic polyfunctional amine salts which contain a terminal carbamic radical, herein also called "carbamate." The preferred crosslinking agents of this class have the formula YHN—R—X wherein R is a cyclic or acyclic alkylene radical containing from 2 to 15 carbon atoms, Y is a hydrogen atom, an alkyl radical or an aryl radical, and X is a carbamic radical wherein one of the oxygen atoms is bonded to a hydrogen atom, as in —NHCOOH. These compounds are more commonly referred to as Zwitter ions, i.e. having positive and negative charges, and are usually set forth as $^+YH_2N$—R—NHCOO$^-$. The alkylene radical in the above formulae can be a hydrocarbon or a substituted hydrocarbon radical and is preferably an unsubstituted hydrocarbon radical. When the alkylene radical is substituted it contains at least one substituent other than hydrogen which is selected from the group consisting of amino, alkyl and aryl radicals and fluorine and chlorine atoms and any combination of the foregoing substituents. When Y is an alkyl or aryl radical, the radicals may be substituted with chlorine and/or fluorine atoms; however, when Y is an alkyl or aryl radical, the radicals are preferably unsubstituted hydrocarbon radicals. Y is most preferably hydrogen. Those crosslinking agents having an acyclic unsubstituted alkylene radical containing from 6 to 10 carbon atoms and having a terminal ammonia group ($^+H_3N-$) and a terminal carbamic radical (—NHCOO$^-$)

as in hexamethyleneamino carbamic acid inner salt, $^+H_3N-(CH_2)_6NHCOO^-$ and the decamethyleneamino carbamic acid inner salt, $^+H_3N-(CH_2)_{10}NHCOO^-$, are most preferred. Other alkylene carbamic acid salts include trimethyleneamino carbamic acid inner salt, tetraethylenetetramino-carbamic acid salt, pentamethyleneaminocarbamic acid salt, heptamethyleneaminocarbamic acid salt, N-phenylhexamethyleneamino carbamic acid salt, pentamethyleneaminocarbamic acid salt, heptamethyleneaminocarbamic acid salt, N-phenylhexamethyleneamino-carbamic acid salt, decamethyleneamino carbamic acid salt, N-carboxypentamethylenediamine, etc. The preferred alkyleneaminocarbamic acid salts of this invention which contain from 3 to 16 carbon atoms are mostly powdery materials and therefore are readily compounded with the polymer.

The above carbamic acid inner salts are prepared by reacting the corresponding polyamines with carbon dioxide under anhydrous conditions. The polyamine is dissolved in a non-polar solvent, such as para-xylene, benzene and toluene, before reacting it with excess carbon dioxide at temperatures between about 20° C. and 100° C., depending upon the solvent used. A method for the preparation of such carbamic acid inner salts is described in patent application Serial No. 605,188, filed August 20, 1956.

Generally, the amount of crosslinking agent employed in this invention can be varied between about 0.1 and about 10 parts of crosslinking agent per 100 parts by weight of curable polymer, preferably from about 0.5 to about 1.5 parts. However, a smaller amount of crosslinking agent may be used when it is desirable to provide a lesser degree of crosslinking. It is also permissible to employ a larger amount of crosslinking agent if the product desired is a highly vulcanized polymer where crosslinking takes place at almost all of the possible sites. This cure rate retardation effect of hydroquinone appears to be peculiar to these crosslinking agents and is not observed when polyamines are employed for crosslinking the highly fluorinated polymer. Although the use of hydroquinone as the sole retarding agent generally provides satisfactory control of the cure rate, it may be desirable in certain cases to employ an added retarding agent, such as the carbon dioxide liberating agents disclosed in my copending application S.N. 36,745, filed June 17, 1960.

The amount of hydroquinone used depends on the particular curable composition and the amount of cure rate retardation desired. Generally the amount of hydroquinone ranges from about 0.1 to about 10 parts per 100 parts by weight of curable polymer, usually between 0.5 and about 5 parts per 100 parts by weight of curable polymer.

When a fluorinated polymer is crosslinked a hydrogen atom of the amino group combines with a halogen atom bonded to a carbon atom of the polymer chain, hydrogen halide is condensed out, and the nitrogen of the amino group is bonded to the carbon atom from which the halogen has been removed. Since hydrogen halide is evolved in the reaction, the curing proceeds most favorably when hydrogen halide is removed. Although removal of hydrogen halide is not essential for the preparation of suitably crosslinked polymer, it is desirable to neutralize and eliminate the hydrogen halide by the addition of a basic compound, preferably an inorganic acid acceptor such as a metal oxide of lead, zinc or magnesium or Dyphos (lead oxide-lead phosphite) or any combination thereof. In some cases, particularly when crosslinking thin polymer sections, the hydrogen halide may be volatilized off at the temperatures used in the crosslinking reaction. When an inorganic acid acceptor is employed, it is usually added to the vulcanization mixture in an amount between about 1 and about 25 parts per 100 parts by weight of curable polymer.

Fillers are often added to the polymers discussed above to improve the molding characteristics and other properties. When a filler is employed it is added to the vulcanization recipe in an amount between about 0.5 and about 50 parts by weight, preferably between about 1 and about 10 parts, per 100 parts by weight of curable polymer. Examples of fillers which may be used to improve molding characteristics of the polymers involved in the crosslinking or curing process of this invention are Syton-200 silica, precipitated silica (such as Hysil-303), a silicon tetrachloride which has been treated in an oxidizing flame, such as Babotsil, and a clay silicate such as magnesium aluminum silicate (Iceberg Pigment). Plasticizer and softeners, preferably ester type materials, are also added if desired.

Another additive which does not significantly affect the cure but which may increase modulus, tensile strength and hardness of the polymer is furnace carbon or carbon black such as, for example, Statex-R carbon black, Phil-black O, channel black, and thermal black. Although from about 5 to about 200 parts by weight of carbon black may be employed per 100 parts of curable polymer, it is generally preferred to use from about 1 to about 50 parts of black, most preferably from 15 to 25 parts.

about 350° F. for a period of from 10 minutes to about 15 hours, usually from 30 minutes to 2 hours. A pressure of between about 100 and about 2000, preferably between about 500 and about 1000 p.s.i.g. is imposed on the compounded mixture in the mold. The molds may be first coated with release agents, such as a silicone oil (e.g. DC-200), and prebaked. The molded vulcanizate is then usually baked at a temperature between about 300° F. and about 500° F., preferably at about 400° F. for a period of from 2 hours or less to 25 hours depending on the cross-sectional thickness of the sample. The molds are generally baked at atmospheric pressure, although pressures up to 15 or 20 atmospheres may be applied if desired.

The following examples are offered as a better understanding of the present invention and are not to be unnecessarily construed as limiting the scope thereof. The Mooney scorch readings are indicative of resistance to premature curing of the compounded stock. These readings were derived from the test described in ASTM D 1077–55T, using the small rotor at 250° F., and represent the time required for the Mooney viscosity to rise 10 units from the lowest viscosity value.

Table I

| Example | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|
| Mooney reading | 8 | 9 | 10 | 10 | 19 | 17 | 24 | 17 | 25+ | 21 | 21 | 19 | 21 | 18 | 17 | 25 | 21 | 14 | 13 | 14 | 12 | 14 | 25+ | 19 |
| Fluorel [1] | 100 | 100 | 100 | 100 | 100 | 100 | 100 | 100 | 100 | 100 | 100 | 100 | 100 | 100 | 100 | 100 | 100 | 100 | 100 | 100 | 100 | 100 | 100 | 100 |
| HMDAC [2] | 1.5 | 1 | 1 | 1 | 1 | 1 | 1 | 1 | 1 | 1.4 | 1.4 | 1.4 | 1.4 | 1.4 | 1.4 | 1.4 | 1.4 | 1.75 | 1.75 | 1.75 | 1.75 | 1.5 | 0.5 | 1.5 |
| Carbon black | 15 | 15 | 15 | 15 | 15 | 15 | 15 | 15 | 15 | 15 | 15 | 15 | 15 | 15 | 15 | 15 | 15 | 15 | 15 | 15 | 15 | 15 | 15 | 15 |
| MgO | 20 | 20 | 20 | 20 | 20 | 20 | 20 | 20 | 20 | 20 | 20 | 20 | 20 | 20 | 20 | 20 | 20 | 20 | 20 | 20 | 20 | 20 | 20 | 20 |
| MgCO₃ | | | | | | | | | 5 | | | | | | 5 | | 5 | | | | | | | |
| Cu inhibitor [3] | | | | | | | | | | 0.5 | 0.5 | 0.5 | | 0.2 | 0.5 | 0.8 | 0.5 | | | | | | | |
| Salicylic acid | | | | | | | 0.5 | | | 0.5 | 0.5 | 0.5 | | 0.5 | | | | 0.5 | 0.5 | 0.5 | | | | |
| Hydroquinone | | | | | 1 | 1 | 1 | 1 | 1 | 1 | 1 | 1 | 1 | 1 | 1 | 1 | 1 | 1 | 1 | 1 | 1 | 1 | 1 | 1.5 |
| NH₄ oxalate | | | | | | | | | 0.5 | | | | | | | | | | | | 0.5 | 0.5 | 0.5 | |
| Piperazine | | | | | | | | | | | | | | | | | | | | | | | 1 | |
| Xylenol | | | 1 | | | | | | | | | | | | | | | | | | | | | |
| Phenol | | | | 1 | | | | | | | | | | | | | | | | | | | | |

[1] "Fluorel" is a registered trademark of the Minnesota Mining and Manufacturing Company and is an elastomeric copolymer of perfluoropropene and vinylidene fluoride (20:80 mole ratio).

[2] HMDAC is hexamethylenediamine carbamate.

[3] Cu inhibitor is 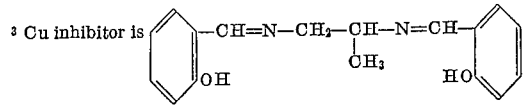

In accordance with this invention, the desired amount of the crosslinking agent and the hydroquinone are added to the unvulcanized fluorocarbon polymer and are intimately admixed therewith or compounded by employing any of the usual rubber mixing devices, such as Banbury mixers, roll mills, or any other convenient mixing device. It has been found that a two-roll rubber mill equipped with heat exchange means, e.g. cored chambers for cooling, is particularly suitable since the heat generated by the high shearing forces in mixing can be dissipated and the temperature more accurately regulated with this device or with devices providing other means for temperature control.

For best results the temperature of the mixture on the mill is not allowed to rise above about 250° F. and is not allowed to fall below 30° F. During milling it is necessary to distribute the crosslinking agent uniformly throughout the curable polymer. However, it is also desirable to prevent extensive crosslinking in the compounding step since most of these fluorinated polymers cannot be cast in a mold after a substantial amount of crosslinking has taken place.

After the composition is milled, the compounded mixture so prepared can be cured immediately or can be stored for a period of two days or more and then cured. The curing process comprises pressing the compounded mixture in a mold and then usually baking the pressing in an oven. Pressing of the compounded mixture is conducted at a temperature between about 200° F. and about 450° F., preferably between about 275° F. and Various other modifications will become apparent to persons skilled in the art from this disclosure, and the illustrative examples are intended only to exemplify the invention and not to limit the scope thereof.

We claim:

1. A method for preventing scorch in the curing of highly fluorinated polymers which comprises admixing with 100 parts by weight of an elastomeric copolymer of vinylidene fluoride and a member of the group consisting of perfluoropropene and chlorotrifluoroethylene, between about 0.1 and about 10 parts of hydroquinone, and between about 0.1 and about 10 parts by weight of a non-aromatic polyfunctional amine salt of the formula

YHN—R—X wherein R is selected from the group consisting of cyclic and acyclic alkylene radicals having from 2 to 15 carbon atoms, Y is selected from the group consisting of hydrogen, alkyl or aryl, and X is a carbamic radical wherein one of the oxygen atoms is bonded to a hydrogen atom.

2. The method of claim 1 in which the elastomeric copolymer is a copolymer of vinylidene fluoride and perfluoropropene.

3. The method of claim 1 in which the elastomeric copolymer is a copolymer of vinylidene fluoride and chlorotrifluoroethylene.

4. A scorch resistant, thermally curable highly fluorinated polymeric composition which comprises an intimate admixture of 100 parts by weight of an elastomeric copolymer of vinylidene fluoride and a member of the group consisting of perfluoropropene and chlorotrifluoroethylene, between about 0.1 and about 10 parts of hydroquinone, and between about 0.1 and about 10 parts by weight of a non-aromatic polyfunctional amine salt of the formula

YHN—R—X wherein R is selected from the group consisting of cyclic and acyclic alkylene radicals having from 2 to 15 carbon atoms, Y is selected from the group consisting of hydrogen, alkyl or aryl, and X is a carbamic radical wherein one of the oxygen atoms is bonded to a hydrogen atom.

5. The composition of claim 4 in which the elastomeric copolymer is a copolymer of vinylidene fluoride and perfluoropropene.

6. The composition of claim 4 in which the elastomeric copolymer is a copolymer of vinylidene fluoride and chlorotrifluoroethylene.

References Cited in the file of this patent
UNITED STATES PATENTS
2,889,309  Teeter _____ June 2, 1959

OTHER REFERENCES
Moran et al., Ind. and Eng. Chem., vol. 51, No. 7, July 1959, pages 831–2.